UNITED STATES PATENT OFFICE.

GEORGE WILLIAMS, OF GARY, ILLINOIS.

PROCESS OF MAKING BUILDING-PLASTER.

SPECIFICATION forming part of Letters Patent No. 783,914, dated February 28, 1905.

Application filed July 18, 1903. Serial No. 166,146.

*To all whom it may concern:*

Be it known that I, GEORGE WILLIAMS, a subject of the King of Great Britain and Ireland, residing at Gary, in the county of Cook and State of Illinois, have invented certain new and useful Improvements in Processes of Making Building-Plaster, of which the following is a specification.

The invention relates to a process for making plaster for building purposes and to the product obtained thereby, its object being to produce a plaster which shall have a more uniform texture, greater plasticity, and greater strength and binding power than those commonly used.

To that end it is the purpose of the invention to produce a plaster which shall contain a large amount of magnesic oxid in association with the quicklime (calcic oxid) commonly used. So far as I am aware no practical way has heretofore been devised for preparing such a plaster, nor has it been ascertained what ingredients must be combined with the compound of magnesium to produce a practicable and suitable plaster.

In preparing my improved plaster I first take the following ingredients in about the following proportions: carbonate of calcium, 54.29 parts; carbonate of magnesium, 42.39 parts; silica, 1.70 parts; oxid of iron, one part; oxid of aluminium, .30 parts; silicate of sodium, .32 parts; total, one hundred parts.

I find that the rock known as "magnesian limestone" or "dolomite" usually contains the above-mentioned ingredients in substantially the proportions stated, and I am therefore able in most cases to take dolomite and break it up into sizes suitable for use in the kiln which is selected for use. If the dolomite used does not contain the above ingredients in about the proportions named, I add a sufficient quantity of those ingredients in which the dolomite is deficient to establish the above proportions. The broken pieces of dolomite are then subjected to a heat of preferably about 1800° Fahrenheit, whereby they become heated to a bright-red heat, and the carbonate of calcium and carbonate of magnesium are reduced to the oxids of those metals.

On delivery from the kiln the calcined fragments are moistened while still hot with a solution of quicklime, (calcic oxid,) water, and sulfuric acid in the proportions hereinafter stated, the solution being applied to the hot fragments by spraying or sprinkling. This solution is prepared by first dissolving one peck of quicklime in one hundred gallons of water and then adding one pint of sulfuric acid. The ingredients are thoroughly mixed, and the solution is then permitted to stand a sufficient time, preferably ten hours or more, to allow the sulfuric acid to act upon all parts of the quicklime. The solution is then drawn off and is ready for use. If the fragments are well calcined, I use about fifteen per cent. of this solution. If, however, the fragments are overburned, only about ten per cent. of the solution should be used, because the fragments will not then absorb so much water. The purpose of this solution is to control the setting of the plaster, so as to prevent too quick action, for the magnesic oxid when treated with water will rapidly set into a stiff mass instead of disintegrating, as is the case when water is added to quicklime. Furthermore, the addition of the sulfuric acid prevents the saturation of the lime with water—that is, prevents the lime from absorbing so much water as to cause deterioration or rottenness, whereby the lime will lose its active or acting properties. At this stage the moistened fragments are allowed to stand for ten hours or more. In order to give the plaster greater body, whereby among other things the plaster is prevented from cracking when applied neat—that is to say, without being mixed with sand—I prefer to add at this stage of the process some one or more of the following substances: lime-rock or magnesium lime-rock, sand-rock, burned clay, coal or wood ashes, or coal-cinders. I find that twenty per cent. of these ingredients is the best proportion, but more or less may be used. At this stage of the process any desired coloring-matter may be added. The mass mixed or not with the above ingredients, as may be desired, is then ground to a fine powder and subjected to steam under pressure of not less than twenty pounds to the square inch. This steam is derived from a solution of silicate of sodium in water, the preferred proportions being one part of silicate of sodium and between three hundred and seventy-five and five hundred parts of water. The purpose of the silicate of sodium is to prevent the saturation of the mass, whereby the material is made stronger and of greater binding property. It also gives the mass a more uniform setting property. If there is any portion of the powdered mass which has not received sufficient moisture in the first application, it will receive it now. The plaster is now ready for use and may be mixed with sand and water, as usual, and applied to the interior or exterior finishings of buildings, or it may be used neat without sand, as may be desired.

In the foregoing specification all measurements are to be understood as measurements by weight, except where measurement by volume is specifically mentioned.

Having now described my invention, what I claim as new, and desire to secure by Letters Patent, is—

1. The process of making building-plaster which consists in first calcining dolomite, and then treating the calcined product with steam from a solution of silicate of sodium.

2. The process of making building-plaster which consists in first calcining dolomite, then moistening the calcined product, then pulverizing it and treating it with steam containing silicate of sodium.

3. The process of making building-plaster which consists in first calcining dolomite, then moistening the calcined product with a solution of water, quicklime and sulfuric acid, then pulverizing it and treating it with steam containing silicate of sodium.

4. The process of making building-plaster which consists in first calcining dolomite, then moistening the calcined product with water containing sulfuric acid and then treating it with steam containing silicate of sodium.

5. The process of making building-plaster which consists in first calcining a mixture of carbonate of calcium, carbonate of magnesium, silica, oxid of iron, oxid of aluminium and silicate of sodium, then moistening the calcined product with a solution of quicklime and sulfuric acid, and then subjecting it to steam under pressure containing silicate of sodium.

6. The process of making building-plaster, which consists in first calcining a mixture of carbonate of calcium, carbonate of magnesium, silica, oxid of iron, oxid of aluminium, and silicate of sodium, then moistening the calcined product, and then treating it with steam from a solution of silicate of sodium.

7. The process of making building-plaster which consists in first calcining carbonate of lime, carbonate of magnesium, silica, oxid of iron, oxid of aluminium and silicate of sodium, then moistening the calcined product with water containing a substance adapted to retard the action of water upon the calcined product, and then subjecting said product in pulverized form to steam under pressure containing a substance adapted to prevent saturation of the mass.

8. A plaster formed by first calcining dolomite, then moistening the calcined product, and then treating it with steam containing silicate of sodium.

9. A plaster formed by first calcining dolomite, then moistening the calcined product with a solution of water, quicklime and sulfuric acid and then subjecting it to steam under pressure containing silicate of sodium.

10. A plaster formed by first calcining a mixture of carbonate of calcium, carbonate of magnesium, oxid of iron, oxid of aluminium, and silicate of sodium, and then treating the calcined product with steam from a solution of silicate of sodium.

11. A plaster formed by first calcining a mixture containing carbonate of calcium, carbonate of magnesium, silica, oxid of iron, oxid of aluminium and silicate of sodium in substantially the proportions named, then moistening the calcined product with a solution of quicklime, sulfuric acid and water, then pulverizing it and subjecting it to steam under pressure containing silicate of sodium.

In testimony whereof I affix my signature in presence of two witnesses.

GEORGE WILLIAMS.

Witnesses:
ARTHUR P. LOTHROP,
EMILY F. OTIS.